United States Patent
Brown (10) Patent No.: US 8,411,593 B2
(45) Date of Patent: Apr. 2, 2013

(54) BIFURCATE SPACE SWITCH

(75) Inventor: David Brown, Carp (CA)

(73) Assignee: IDT Canada Inc, Ottawa (CA)

( * ) Notice: Subject to any disclaimer, the term of this patent is extended or adjusted under 35 U.S.C. 154(b) by 231 days.

(21) Appl. No.: 12/004,445

(22) Filed: Dec. 20, 2007

(65) Prior Publication Data

US 2008/0205424 A1    Aug. 28, 2008

Related U.S. Application Data

(60) Provisional application No. 60/870,866, filed on Dec. 20, 2006.

(51) Int. Cl.
*H04L 12/28* (2006.01)
*H04L 12/56* (2006.01)
*H04Q 11/00* (2006.01)
*G06F 3/00* (2006.01)
*G06F 5/00* (2006.01)

(52) U.S. Cl. ........ 370/257; 370/366; 370/380; 370/415; 370/427; 710/53; 710/56

(58) Field of Classification Search .......... 370/380, 370/412–418, 257, 362–372, 427–429; 710/52–54, 710/56
See application file for complete search history.

(56) References Cited

U.S. PATENT DOCUMENTS

| | | | |
|---|---|---|---|
| 5,905,726 A * | 5/1999 | Gupta | 370/390 |
| 6,763,030 B1 * | 7/2004 | Regev et al. | 370/419 |
| 7,016,377 B1 * | 3/2006 | Chun et al. | 370/493 |
| 2003/0061528 A1 * | 3/2003 | Blake et al. | 713/600 |
| 2004/0028164 A1 * | 2/2004 | Jiang et al. | 375/371 |
| 2004/0037329 A1 * | 2/2004 | Hein et al. | 370/529 |
| 2005/0063307 A1 * | 3/2005 | Samuels et al. | 370/235 |
| 2005/0135398 A1 * | 6/2005 | Muthukrishnan et al. | 370/428 |
| 2007/0058632 A1 * | 3/2007 | Back et al. | 370/392 |
| 2007/0171754 A1 * | 7/2007 | Nam et al. | 365/230.03 |
| 2007/0268931 A1 * | 11/2007 | Shaikli | 370/468 |
| 2008/0052431 A1 * | 2/2008 | Freking et al. | 710/104 |
| 2008/0151753 A1 * | 6/2008 | Wynne | 370/235 |

OTHER PUBLICATIONS

Grant Wheeler/Ryan Haraden, Conversion of PCI-X ASIC to PCI Express 1.1, 2005 Conference, Published to the Internet Oct. 13, 2007—http://www.pcisig.com/developers/main/training_materials, pp. 20-21.*

* cited by examiner

*Primary Examiner* — Andrew Lai
*Assistant Examiner* — Jeremy Costin
(74) *Attorney, Agent, or Firm* — Bever, Hoffman & Harms LLP (57) ABSTRACT

A space switch includes a buffer having a plurality of serial inputs, a plurality of de-serializers, each coupled to a respective input, a plurality n of buffers and a media access controller having inputs coupled to the plurality of de-serializers, data outputs coupled to the buffers, and two control outputs coupled to respective buffers for buffering input data at a clock rate one-nth that of the input data and a switch fabric connected to the buffers for matching buffer data throughput with switch data throughput. Preferably the buffer is a bifurcate buffer. This space switch described ensures matching of buffer and switch fabric throughput.

14 Claims, 8 Drawing Sheets

BIFURCATE SPACE SWITCH

RELATED APPLICATIONS

This application claims the benefit of U.S. Provisional Patent Application No. 60/870,866, filed on Dec. 20, 2006 by the same inventor, which is incorporated herein by reference in its entirety.

FIELD OF THE INVENTION

The present invention relates to bifurcate space switches and is particularly concerned with those having very high speed buffers.

BACKGROUND OF THE INVENTION

Peripheral Component Interconnect Express, PCIe 2.0 specifies 5.0 Gigbit/s symbol rate per lane. Multiple lanes can be used to fabricate larger port bandwidths. For example, a x4 port would have an aggregate symbol rate of 20B, and a bit rate of 16F, if 8b10b coding is used. A x8 port would have an aggregate symbol rate of 40G, and a bit rate of 32G. There are other serial interconnect protocols, for example serial rapid IO that have similar properties. This disclosure will focus on PCIe, but is not limited to that protocol.

Figure 1:
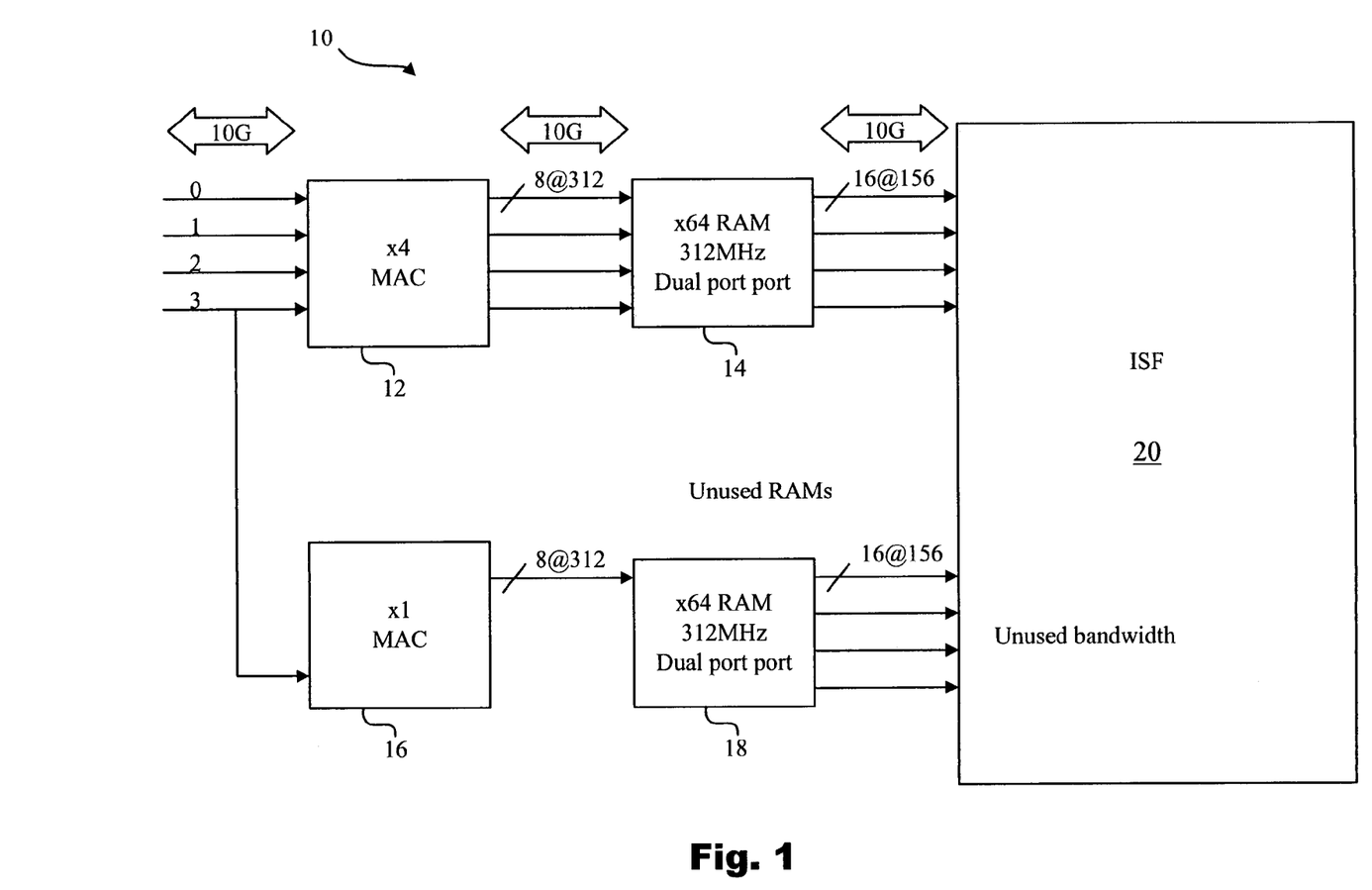
FIG. 1 illustrates a known bifurcate port configured as a 1x4 port and space switch arrangement.

In certain serial protocols (PCIe, SRIO, for example), a port can bifurcate. What this means is that a x8 port may split into two x4 ports. An example of a typical implementation of how this is achieved is shown in FIG. 1. The x4 port 10 includes a x4 media access controller (MAC) 12, a first x64 RAM 14, a x1 MAC 16 and a second x64 RAM 18 coupled to an internal switch fabric (ISF) 20. This example is SRIO where the x4 port can bifurcate into 2x1. The port 10 shown in FIG. 1 is configured to run as 1x4. Note that the ISF (Internal Switch Fabric) has more ports than are shown.

Figure 2:
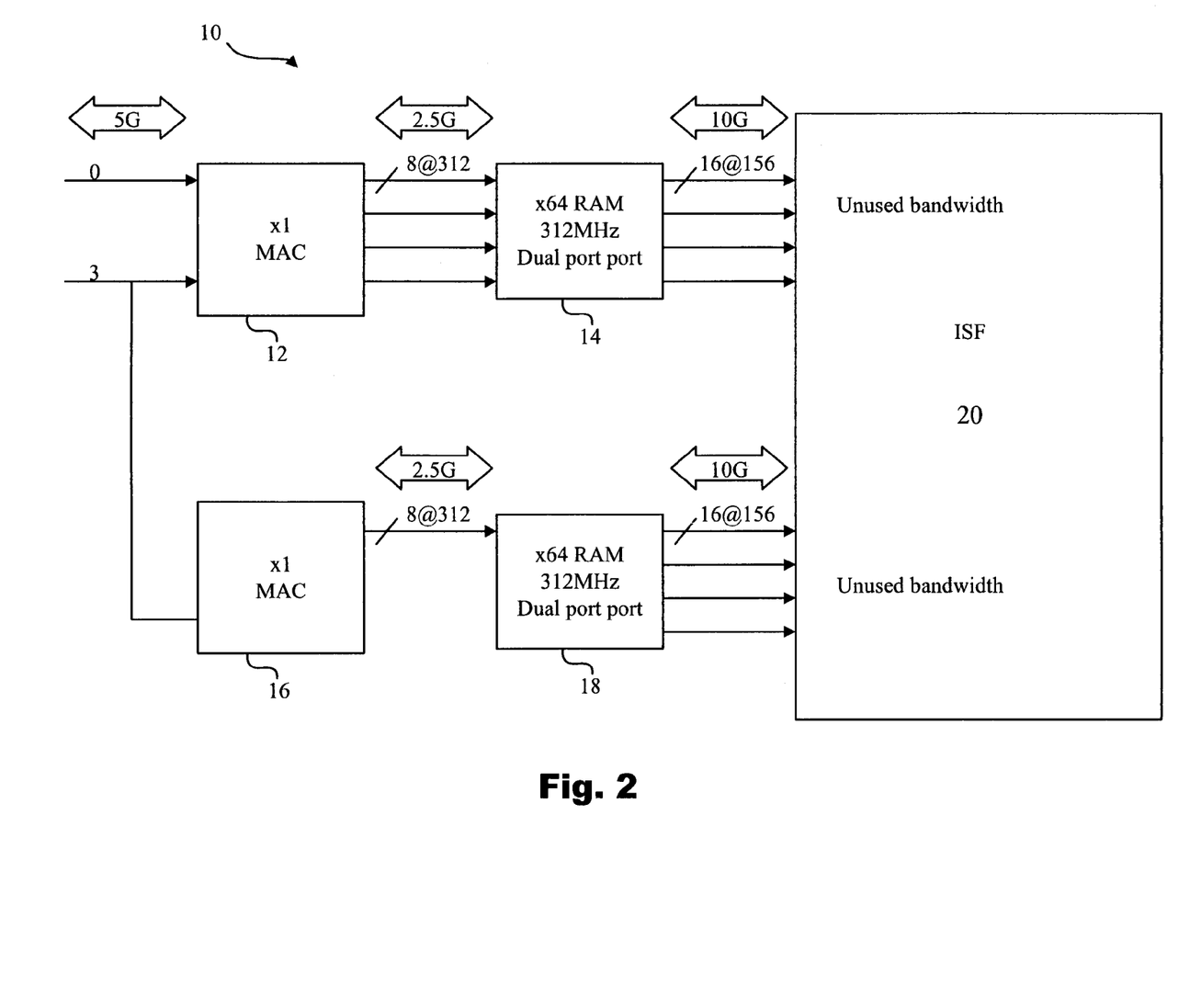
FIG. 2 illustrates a known arrangement of FIG. 1 configured for 2x1 ports.

Referring to FIG. 2, the bifurcate port of FIG. 1 is shown configured for 2x1 operation. The architecture of FIGS. 1 and 2 is simple conceptually, and is the typical way of attaching bifurcated ports to an ISF. But it wastes buffers in the 1x4 mode, and doubles the ISF bandwidth. The port speed is 10 G in the 1x4 mode, and the ISF port bandwidth consumed is 20 G. Both of these items add area and thus cost to the implementation.

SUMMARY OF THE INVENTION

An object of the present invention is to provide an improved bifurcate buffer.

In accordance with an aspect of the present invention there is provided a bifurcate space switch comprising a space switch comprising a plurality n of buffers; a media access controller having data outputs coupled to the buffers, and a plurality of control outputs coupled to respective buffers for buffering input data at a clock rate one-nth that of the input data; and a switch fabric connected to the plurality of n buffers for matching buffer data throughput with switch data throughput.

In accordance with another aspect of the present invention there is provided a bifurcate space switch comprising a bifurcate space switch comprising a plurality of serial inputs; a plurality of de-serializers, each coupled to a respective input; two buffers; a media access controller having inputs coupled to the plurality of de-serializers, data outputs coupled to the buffers, and two control outputs coupled to respective buffers for buffering input data at a clock rate one-half that of the input data; and a switch fabric connected to the buffers for matching buffer data throughput with switch data throughput.

In accordance with a further aspect of the present invention there is provided a bifurcate space switch comprising a plurality of serial inputs; a plurality of de-serializers, each coupled to a respective input; two buffers; two media access controllers each having inputs coupled to one-half the plurality of de-serializers, data outputs coupled to the buffers, and a control output coupled to respective buffers for buffering input data at a clock rate one-half that of the input data; and a switch fabric connected to the buffers for matching buffer data throughput with switch data throughput.

By matching buffer throughput and switch fabric throughput a more effective use of buffers and fabric bandwidth is made.

BRIEF DESCRIPTION OF THE DRAWINGS

The present invention will be further understood from the following detailed description with reference to the drawings in which.

DETAILED DESCRIPTION OF THE PREFERRED EMBODIMENT

Figure 3:
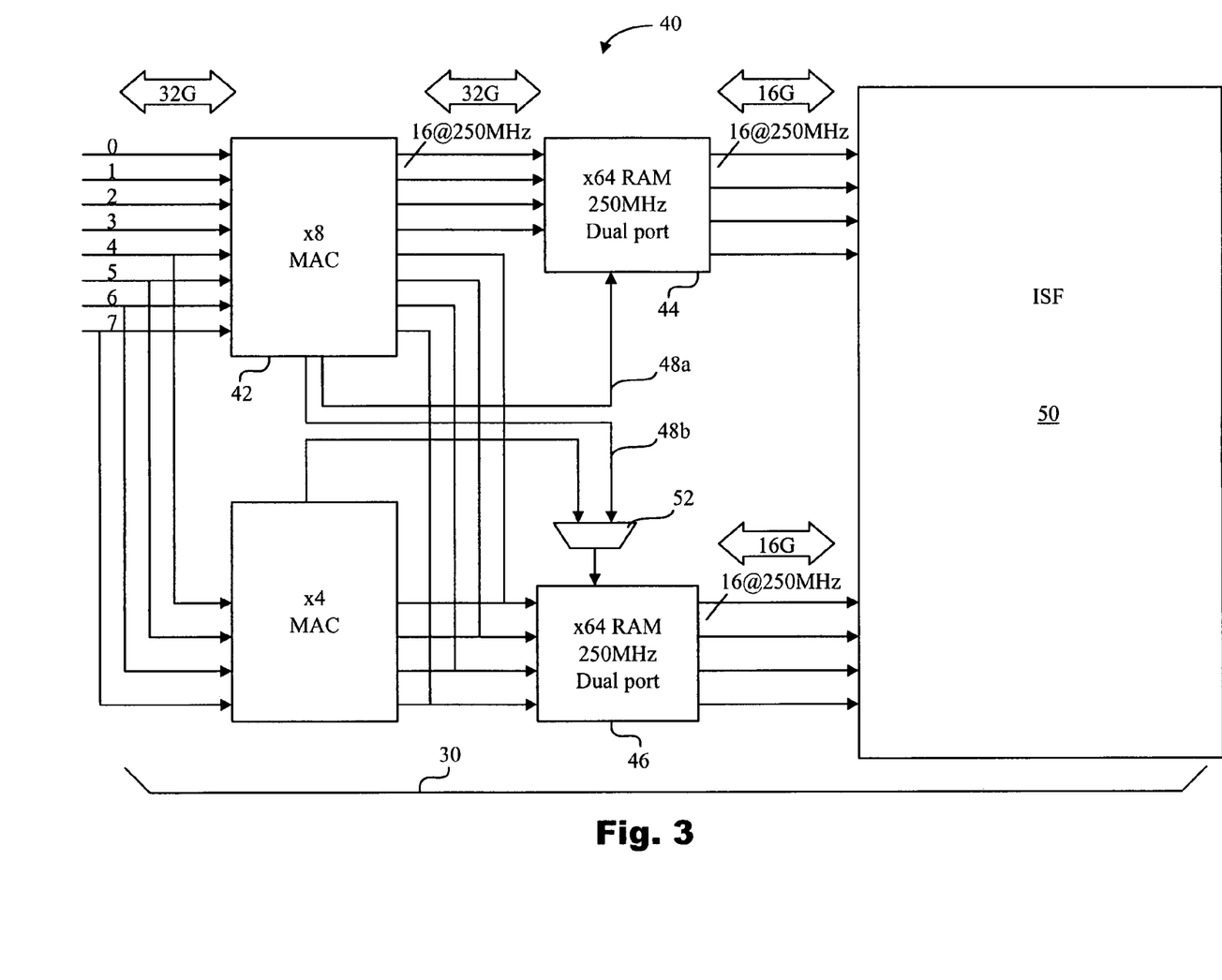
FIG. 3 illustrates a bifurcate space switch in accordance with an embodiment of the present invention in a first configuration.

Referring to FIG. 3 there is illustrated a bifurcate space switch in accordance with an embodiment of the present invention. The bifurcate space switch 30 includes a bifurcate buffer 40 and an ISF 50. The bifurcate buffer 40, shown configured as a 1x8 port, includes a media access controller (MAC) 42 receiving input from serializer/de-serializer (SERDES) (not shown in FIG. 3) and outputting four 16-bit wide lanes to each of x64 RAM 44 and 46, controlled by lines 48*a* and 48*b*, respectively. The control line 48*b* is coupled to the x64 RAM 46 via a MUX 52, which is used to change configuration of the bifurcate buffer 40.

In operation, the data is written into two-x64 250 MHz dual port RAM 44 and 46. The memory management of the MAC 42 generates different addresses for each bank. In the configuration shown, the 1x8 port 40 is connected to the ISF 50 in such a way as to ensure that the external bandwidth and ISF bandwidth are the same, and that both buffers 44 and 46 are used.

Figure 4:
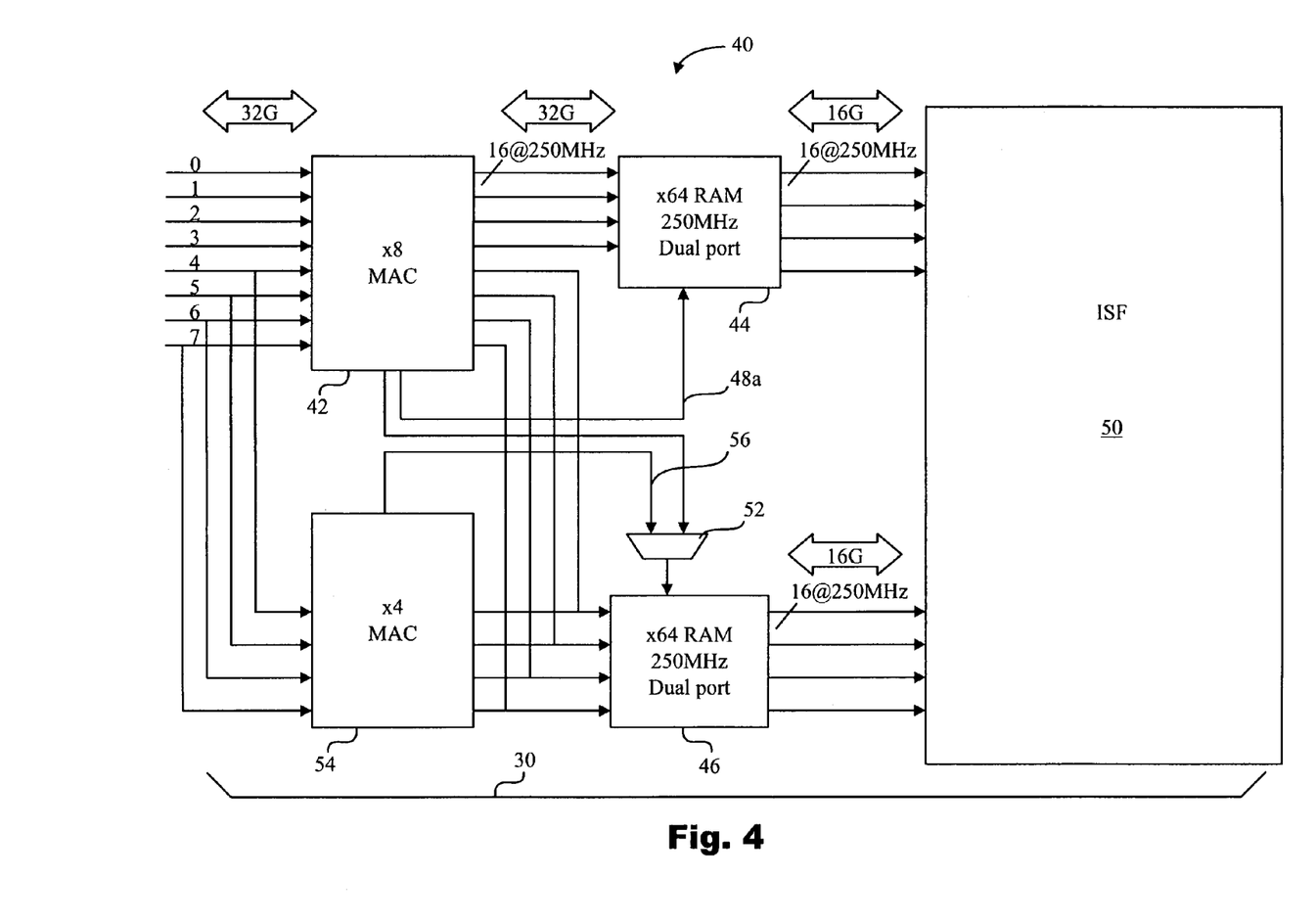
FIG. 4 illustrates a bifurcate space switch in accordance with an embodiment of the present invention in a second configuration.

Referring to FIG. 4 there is illustrated a bifurcate space switch of FIG. 3 in a second configuration of the embodiment of the present invention. In the 2x4 configuration, the bifurcate space switch 30 includes a 2x4 bifurcate buffer 40 having a first media access controller (MAC) 42 receiving input from serializer/de-serializer (SERDES) and outputting four 16-bit wide lanes to x64 RAM 44, controlled by line 48*a*. The 2x4 bifurcate buffer 40 also includes a second media access controller (MAC) 54 receiving input from the lower four serializer/de-serializer (SERDES) and outputting four 16-bit wide lanes to x64 RAM 46, controlled by line 56. Hence, in this example the 1x8 port 40 bifurcates to 2x4 ports.

In operation, the upper x8 MAC 42 is configured to run in x4 mode. Here each buffer 44 and 46 is managed by its respective MAC 42 and 54. Again note that both buffers are used and the ISF bandwidth equals the port bandwidth.

Herein above, the port connection to the ISF 50 has been described. Now the operation of the ISF 50 is described. The problem now is how ports of different sizes connect to each other, and in such a way as to use the full ISF bandwidth. For example, a x8 port could talk to a x4 port at ½ the bandwidth, but that would waste bandwidth. The requirement is that a x8 port can send to two different x4 ports at the same time, and that two x4 ports can send to a x8 port at the same time. The principle behind this concept is that the ISF connections are time division multiplexed (TDM). There are two phases of the configuration (and thus the data path connectivity). There would be 4 phases to support quad-furcation, not described here.

In general, serial protocols transmit packets of varying length. The packet length is characterized as min, max and in certain quantized steps. In general a minimum size packet may take only one or two clock ticks to transverse the ISF, and maximum sized packets take many. For example, PCIe, can have a payload of 0-2 Kbytes, in DWORD increments, plus header. With a PCIe 5 G x8 port, switching 16 bytes per tick, it would take up to 128 ticks for the payload, and two ticks for the header. Once a packet starts transmitting from ingress to egress port the connection is held until the packet is completed. This significantly simplifies the egress and ingress buffer design, no need for segmentation and reassembly. This is not a requirement but is accepted as the simplest implementation.

Figure 5:
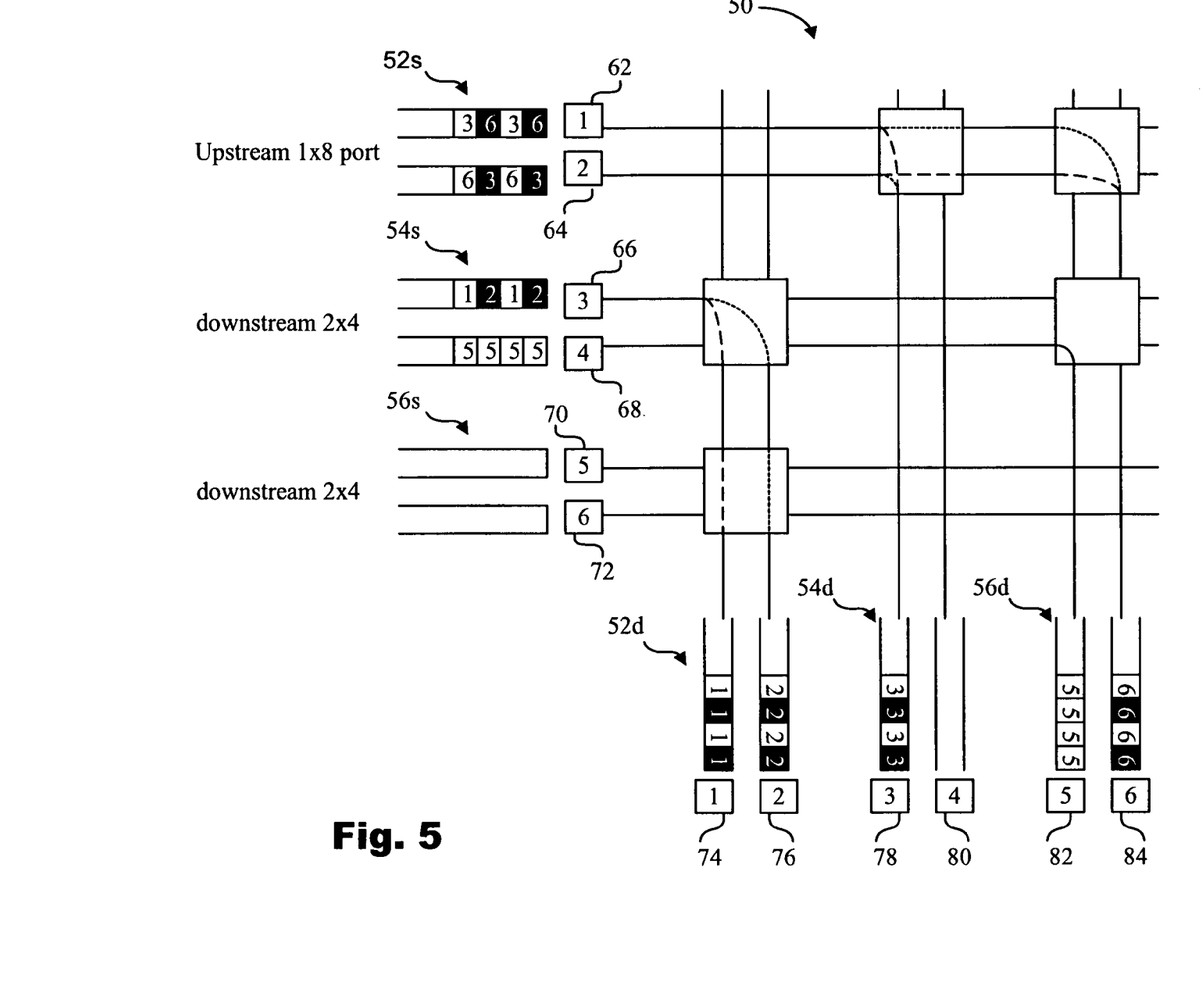
FIGS. 5 and 6 illustrate switching for the bifurcate space switch of FIG. 3.

Referring to FIG. 5, there is illustrated a data path diagram of a cross bar ISF 50. In this example, an upstream port is configured as a 1x8 port 52s and the downstream ports are configured as 2x4 ports 54d and 56d. The upstream port 52s connects to source (ports 1 and 2) 62 and 64 on the ISF 50. Note that typically, a packet takes several clock ticks to complete transmission. On the black clock tick, source (port 1) 62 is connected to destination (port 6) 84, and on the white clock tick, source (port 1) 62 is connected to destination (port 3) 78. Similarly, on the black clock tick, source (port 2) 64 is connected to destination (port 3) 78, and on the white clock tick, source (port 2) 64 is connected to destination (port 6) 84. Source (port 3) 66, which is a x4 port 54s, sends to destination (port 1) 74 and destination (port 2) 76, which together comprise a x8 port. Similarly, source (port 5) 70 sends to destination (ports 1 and 2) 74 and 76. Also shown is source (port 4) 68 sending to destination (port 5) 82. This connection is the same for both clock phases. The numbers inside the queues designate the destination port.

Figure 6:
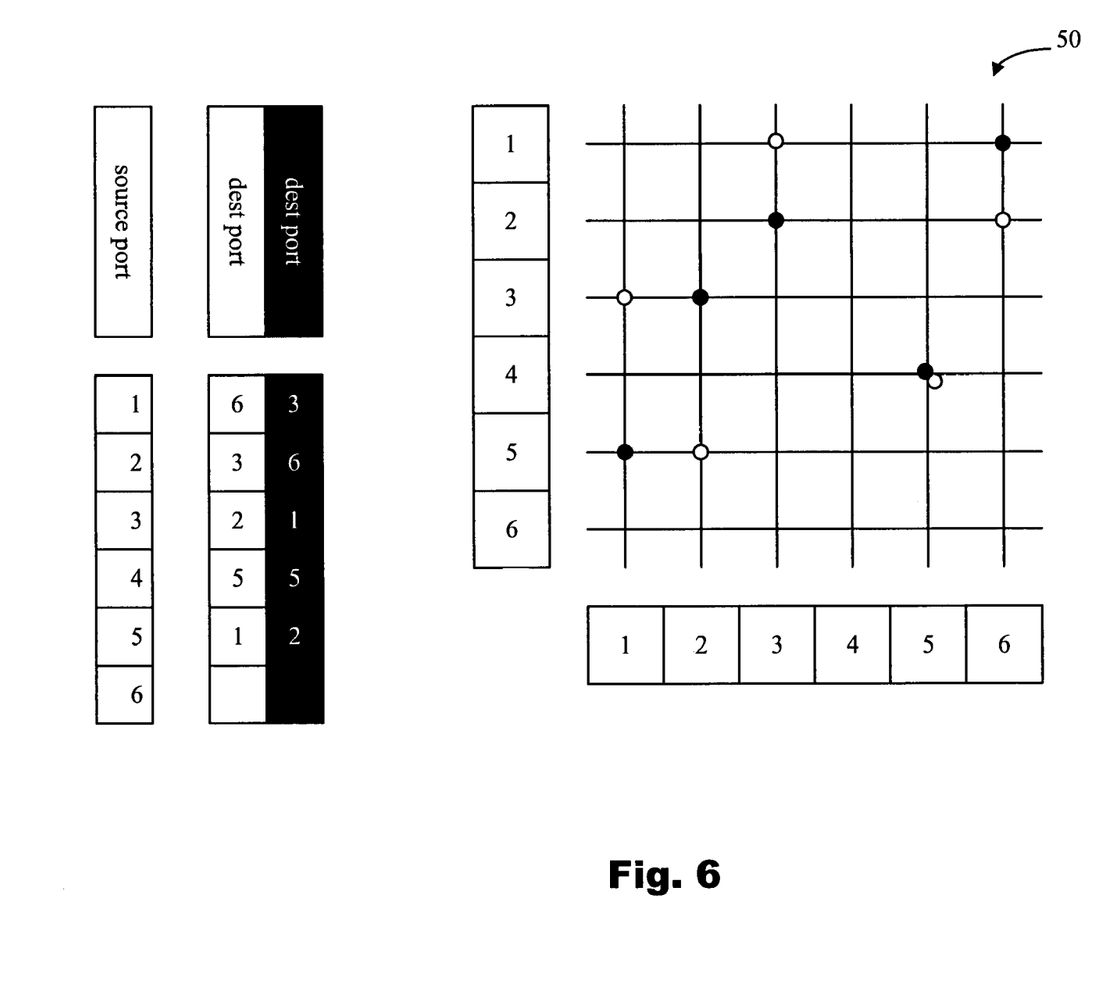

Referring to FIG. 6, there is illustrated the same switching configuration as FIG. 5, using a different diagram.

Figure 7:
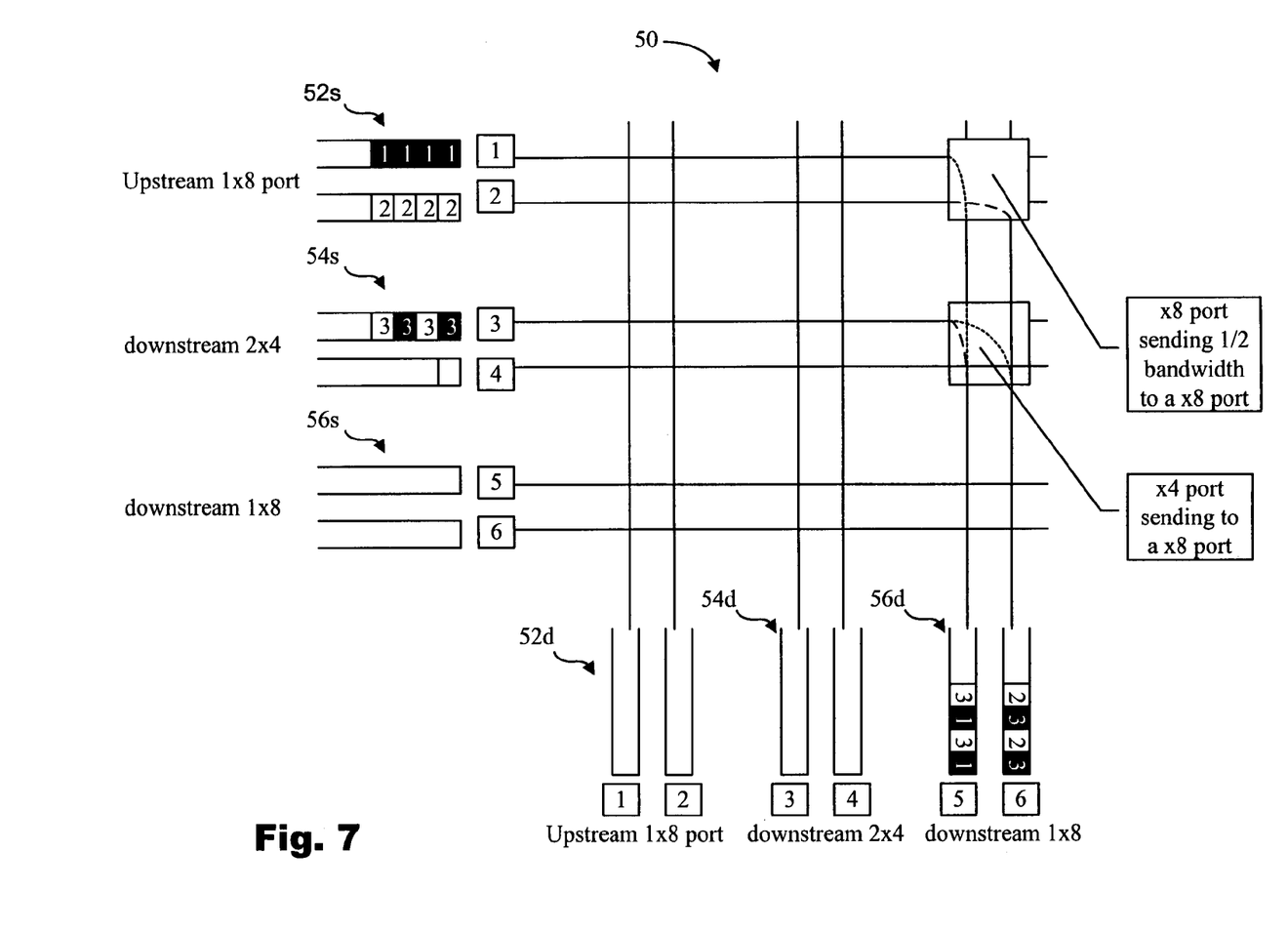
FIGS. 7 and 8 illustrate switching for the bifurcate space switch of FIG. 4.

FIG. 7 shows another possible switch configuration. This shows a x4 port 54s sending to a x8 port 56d and one-half of a x8 port 52s sending to a x8 port 56d. This is an important capability; we do not want a x4 port to a x8 port connection, blocking a x8 port to x8 port connection. Here the numbers represent the source port.

Figure 8:
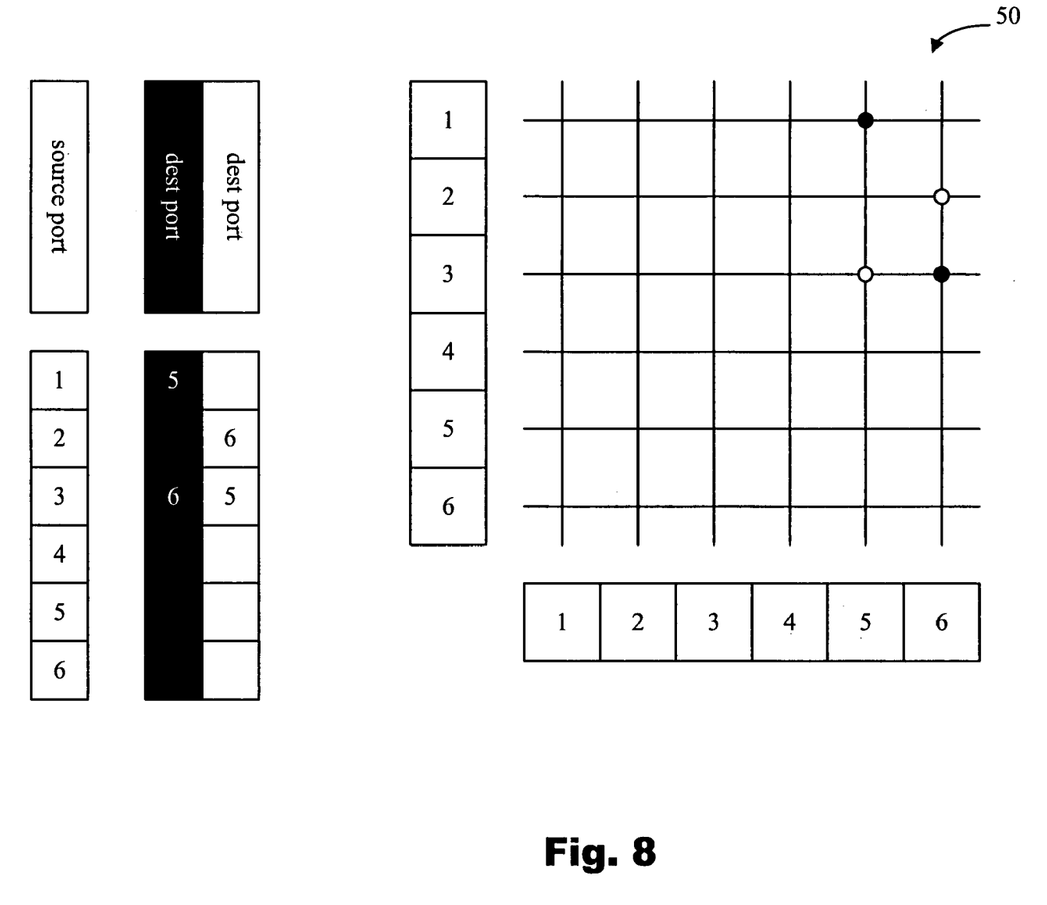

Referring to FIG. 8 there is an alternative diagrammatic representation of the switch configuration in FIG. 7.

The preceding, examples describes a x8 5 Gig PICe port that can bifurcate to 2x4 5 Gig PCIe ports. The present embodiment can be adapted to other speeds, port segmentations for example quad-furcation, and protocols, to provide the benefit there from.

Numerous modifications, variations and adaptations may be made to the particular embodiments described above without departing from the scope patent disclosure, which is defined in the claims.

What is claimed is:

1. A space switch comprising:
  a plurality of serial inputs;
  a first media access controller having inputs coupled to each of the plurality of serial inputs;
  a second media access controller having inputs coupled to a subset of the plurality of serial inputs;
  a first buffer coupled to receive a first set of parallel data and a first control output from the first media access controller;
  a second buffer coupled to receive a second set of parallel data and a second control output from the first media access controller in a first configuration, and coupled to receive a third set of parallel data and a third control output from the second media access controller in a second configuration; and
  a switch fabric coupled to receive the first and second sets of parallel data from the first and second buffers in the first configuration, and coupled to receive the first and third sets of parallel data from the first and second buffers in the second configuration.

2. The space switch of claim 1, wherein the subset of the plurality of serial inputs comprises half of the serial inputs.

3. The space switch of claim 1, wherein a bandwidth of the serial inputs is the same as a bandwidth between the first and second buffers and the switch fabric in both the first and second configurations.

4. The space switch of claim 1, wherein the first buffer operates at a first bandwidth in both the first and second configurations, and the second buffer operates at the first bandwidth in both the first and second configurations.

5. The space switch of claim 1, further comprising a multiplexer that couples the second control output to the second buffer in the first configuration, and couples the third control output to the second buffer in the second configuration.

6. The space switch of claim 1, wherein the first and second media access controllers and the first and second buffers form one port in the first configuration, and two ports in the second configuration.

7. The space switch of claim 1, wherein the first and second buffers have a first data throughput that matches a second data throughput of the switch fabric.

8. The space switch of claim 1, wherein the switch fabric comprises means for switching the first and second sets of parallel data received from the first and second buffers in the first configuration, which defines an upstream port, to two downstream ports at the same time, wherein the upstream port has a different size than each of the two downstream ports.

9. The space switch of claim 8, wherein the first and second sets of parallel data received from the first and second buffers in the first configuration are switched from the upstream port to the two downstream ports in a time division multiplexed manner.

10. The space switch of claim 1, wherein the switch fabric comprises means for switching the first and third sets of parallel data received from the first and second buffers in the second configuration, which defines two upstream ports, to a downstream port at the same time, wherein the two upstream ports have different sizes than the downstream port.

11. The space switch of claim 10, wherein the first and third sets of parallel data received from the first and second buffers in the second configuration are is switched from the two upstream ports to the downstream port in a time division multiplexed manner.

12. The space switch of claim 1, wherein the switch fabric comprises means for switching the first and second sets of parallel data received from the first and second buffers in the first configuration, which defines one upstream port, to one downstream port.

13. The space switch of claim 1, wherein the switch fabric comprises means for switching the first and second sets of parallel data received from the first and second buffers in the first configuration, which defines a first upstream port, and a fourth set of parallel data received from a second upstream port to a downstream port in a time division multiplexed manner, wherein the first and second upstream ports have different sizes.

14. The space switch of claim 13, wherein the first upstream port has a first bandwidth, wherein the first and second sets of parallel data received from the first and second buffers in the first configuration are transmitted from the first upstream port to the downstream port at a bandwidth equal to one half of the first bandwidth.

* * * * *